Aug. 15, 1961 R. M. HELLER 2,995,782
METHOD OF FORMING LOCK AND SEAL WASHERS, NUTS, AND THE LIKE
Filed Nov. 10, 1958
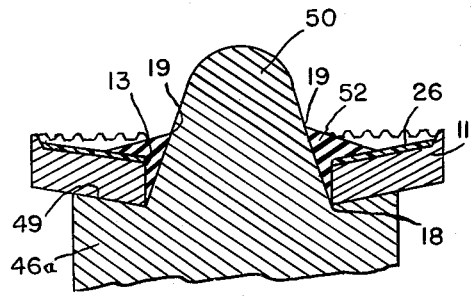
FIG.9.
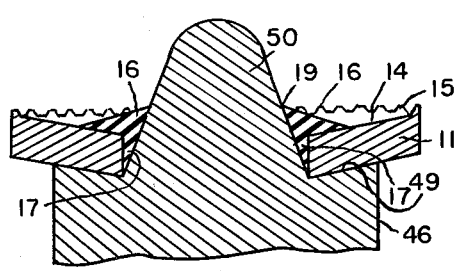
FIG.10.
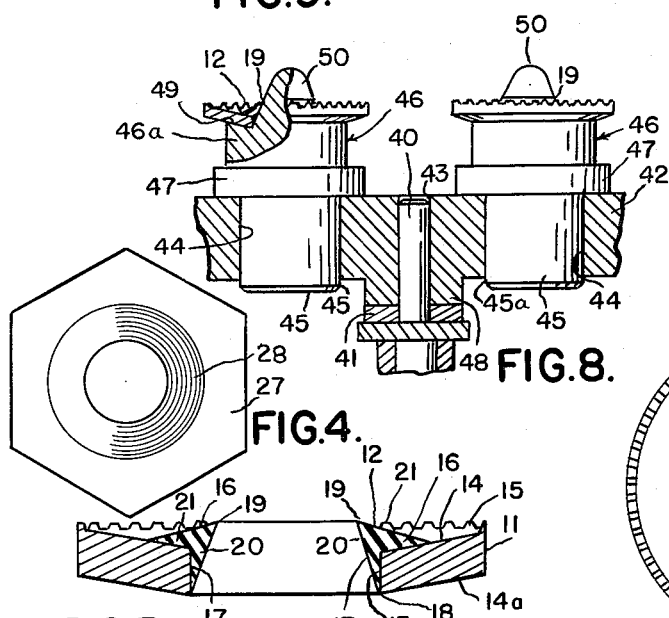
FIG.1.
FIG.8.
FIG.4.
FIG.2.
FIG.3.
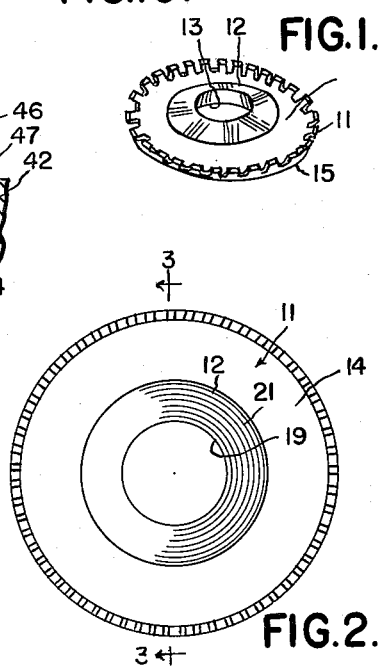
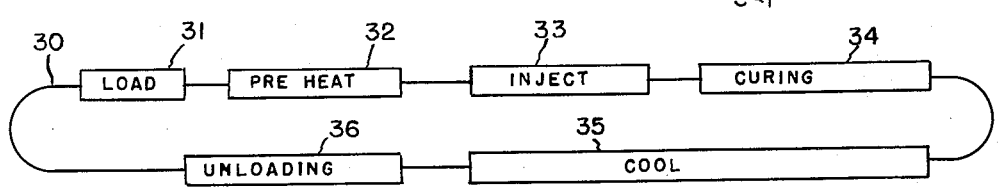
FIG.7.
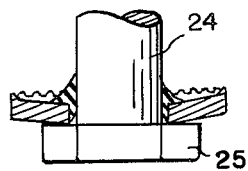
FIG.6.
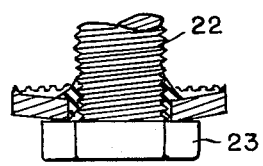
FIG.5.
INVENTOR.
ROBERT M. HELLER
BY
Whittemore, Hulbert & Belknap
ATTORNEYS

United States Patent Office 2,995,782
Patented Aug. 15, 1961

2,995,782
METHOD OF FORMING LOCK AND SEAL WASHERS, NUTS, AND THE LIKE
Robert M. Heller, Birmingham, Mich., assignor to Watts Electric & Mfg. Co., Birmingham, Mich., a corporation of Michigan
Filed Nov. 10, 1958, Ser. No. 772,901
5 Claims. (Cl. 18—59)

The present invention relates to a method for manufacturing composite articles, and refers more particularly to composite washers, composite nuts, and the like.

One of the essential objects of the invention is to provide a method for the manufacture of a composite article of the type mentioned, wherein a washer, nut or the like, has bonded thereto a ring or annulus of resilient and deformable material that is operable to securely hold or retain such washer or nut against displacement when sleeved upon the shank or stem of a bolt, screw or the like, and that is also operable as a sealant to effectively prevent dirt, dust and moisture from passing between the washer or nut and the shank or stem of the bolt or screw when the parts are assembled.

It is another object of the present invention to provide a method of making the composite article having a body provided with a preformed opening and a resilient ring for said body bonded permanently thereto and having an opening formed therethrough in concentricity with the preformed opening in said body comprising the steps of: placing the body on an upwardly facing mandrel having a tapered pilot element extending axially therefrom with the preformed opening of said body insertable over said tapered pilot element and with the body portion having an upwardly opening cavity for receiving moldable material of a resilient ring; preheating said mold and body; depositing in said preheated mold cavity an exactly metered charge of moldable material capable of flowing around the upstanding tapered pilot element and along a portion of the upwardly opened body cavity, to unite said ring with said body cavity and so that said ring will be placed in exact concentricity with and extend upwardly from said preformed opening with a tapered opening formed therein, curing the material of said ring in said body cavity so that such material will set and will be bonded permanently to said body to form the composite article; cooling the cured material of said composite article; and removing and stripping said composite article from the upstanding pilot element of said mandrel section.

Another object of the present invention is to provide a method of making a series of composite articles wherein each comprises a body provided with a preformed opening, and a resilient ring for said body bonded permanently thereto and having an opening formed therethrough in concentricity with the preformed opening in said body, comprising the steps of: continuously advancing in a horizontal orbit a series of mandrel sections wherein each has an upstanding tapered pilot element for guiding, and receiving thereabout, the opening of said body with said body having an upwardly opening cavity for receiving moldable material of a resilient ring; placing the body on an upwardly facing mandrel having a tapered pilot element extending axially therefrom and with the preformed opening of said body insertable over the tapered pilot element so that the preformed opening and tapered pilot element form dies for the moldable material; successively preheating each advancing mold section and assembled body to condition the assembly for the reception of moldable material; successively depositing in each advancing preheated body cavity an exactly metered charge of moldable material capable of flowing between the upstanding tapered pilot element and the preformed opening and along a body portion to form the material of a resilient ring and to form a tapered opening through the material of the ring, with the ring opening being in exact concentricity with the preformed body opening; successively curing the material of each ring in each advancing mold assembly so that such material will set and will be bonded permanently to said body to form a composite article; successively cooling the cured material of each advancing composite article; and successively removing and stripping each composite article from the upstanding pilot element of each advancing mold section.

Another object of the present invention is to provide in the preceding methods the step of depositing the ring on said body portion and around said pilot element in sufficient amount so that said ring extends axially above said body.

It is another object of the present invention to provide in the above methods a pilot element that is inwardly tapered and which registers at its bottom-most portion with the preformed body opening and then progressively tapers inwardly away from said body opening so that an annular opening is formed between the pilot element and the upper portions of the central opening into which moldable material may flow.

It is another object of the present invention to provide a method for utilizing a mandrel having an upwardly facing surface with a pilot element extending upwardly therefrom which is adapted to receive a metal body or the like having a central opening with the base of the pilot element dimensioned to tightly receive and accurately position said body and with said mandrel surface conforming to the outer body surface to give stable support thereto.

Another object of the present invention is to provide a method for utilizing a mandrel with an inwardly tapered pilot element, the base of which is dimensioned to conform with the preformed opening in said body with the sides of said pilot element tapering inwardly to form an annular clearance between the walls of the opening so that moldable material deposited on said body will flow into the annular clearance and substantially cover the wall of the body opening with the moldable material contacting the inwardly tapered pilot element to thereby be provided with a predetermined corresponding inwardly tapered conformation.

Another object of the present invention is to provide in such a mandrel a central shank or stem downwardly extending and dimensioned to securely fit in a mandrel case or carrier.

These and other objects will become more apparent when a preferred embodiment of my method is described in connection with a drawing, in which:

FIGURE 1 is a perspective view of a composite article produced by my method and apparatus.

FIGURE 2 is a top plan view of the embodiment shown in FIGURE 1.

FIGURE 3 is a section taken at 3—3 of FIGURE 2.

FIGURE 4 is a top plan view of another form of composite article wherein a nut is employed instead of a washer.

FIGURE 5 is a vertical sectional view through the composite article after it has been applied to the threaded shank of a bolt.

FIGURE 6 is a vertical sectional view through a composite article after it has been applied to the smooth shank of a bolt.

FIGURE 7 is a schematic plan view of the endless conveyor and stations through which the conveyor passes.

FIGURE 8 is a partially broken away vertical sectional view of a pair of mandrels fitted into a mandrel carrier or case.

FIGURE 9 is a fragmentary vertical sectional view through a plastic-coated washer-supporting mandrel with a ring formed centrally in the washer and about a mandrel pilot element.

FIGURE 10 is a view similar to FIGURE 9 wherein the washer does not have a plastic coating.

FIGURES 1–6 of the drawing illustrate structural features of typical composite articles and their application, which articles may be produced at high speed and of an excellent quality by my improved method and apparatus. Regardless of its particular features, any such article will include a body 11 of metal or other relatively rigid material, and a resilient member or ring 12 of a suitable moldable material. In the particular embodiment of FIGURES 1–3, the body 11 has a central opening or bore 13 and a smooth concave surface 14 and a smooth convex surface 14a, and is provided at the periphery of the concave surface 14 with a series of circumferentially spaced teeth 15.

The ring 12 preferably is formed from an exactly metered quantity of liquid plastisol such as polyvinyl chloride or the like, that is deposited upon the body 11. The ring 12 is bonded permanently to and is an integral part of the body 11.

Preferably, the ring 12 has two integrally connected divergent portions 16 and 17 within the central opening or bore 13 and has one end 18 substantially flush with the uncovered convex surface 14a, and has another end 19 axially extending and projecting outwardly beyond the concave surface 14 and teeth 15 of the body 11 and that is formed by the apex portions 16 and 17.

Actually, the ring 12 is substantially V-shaped in cross-section and straddles a corner of the washer. Also, each of the diverging portions 16 and 17 is tapered from the joint therebetween, and the outer sides 20 and 21 respectively of the annulus or ring 12 are inclined from the apex of the V to the pointed ends respectively of the two tapered portions 16 and 17. Thus, one outer side 20 forms a substantially frusto-conical opening, while the other outer side 21 forms a relatively smooth surface disposed at substantially an obtuse angle to the concave surface 14 of the washer.

The composite article is adapted to be sleeved upon either a threaded shank or stem 22 of a bolt or screw 23, as illustrated in FIGURE 5, or upon a smooth shank or stem 24 of a bolt or screw 25, as illustrated in FIGURE 6. In either illustration, the sealant annulus 12 is operable to securely hold or retain such composite article against displacement, and is also operable as a sealant to effectively prevent dirt, dust and moisture from passing between the washer body 11 and the shank or stem of the bolt or screw when the parts are assembled.

The diameter at the small end of the frusto-conical opening formed by the outer side 20 is less than the cross-sectional area or diameter of the shank or stem of the bolt or screw, so that the axial extension 19 will have a tight fit upon and sealing engagement with the shank or stem of the bolt or screw when the composite article is assembled therewith.

When the assembled bolt and composite article are attached or fastened to a separate article (not shown) the portion 16 of the ring or annulus upon the concave surface 14 of the washer body will be compressed by the adjacent surface of said separate article during tightening movement of the bolt, and such compression will cause the axial extension 19 and tapered portion 17 to be deformed and pressed harder or tighter against the shank or stem of the bolt. Consequently, a tight seal will be obtained between the sealant ring or annulus 12 and the separate article to which the bolt or screw is attached, and the tight fit and sealing engagement between the ring 12 and the shank of the bolt will be increased or intensified during tightening movement of the bolt. It will also be apparent that the circumferentially spaced teeth 15 on the washer will bite into the adjacent surface of the separate article during the tightening movement of the bolt to obtain a firm anchorage between the washer and said adjacent surface.

In FIGURE 9 a modified washer is shown fitted on a mandrel, and the concave surface 14 of the washer body 11 is initially provided with an adhering coating 26 of plastic material to which the subsequently applied material of the annulus sealant 12 will adhere. Otherwise, the construction in FIGURE 9 is the same as in FIGURES 1–3.

In FIGURE 4 we have illustrated another form of composite article, wherein an ordinary nut 27 is employed instead of the washer body 11 and is provided with a ring or annulus 28 of resilient and deformable material similar in every respect to the annular sealant 12 in FIGURES 1–3. However, in this construction, the circumferentially spaced teeth 15 have been eliminated entirely.

The composite article has now been described and in the description of the method for the manufacture thereof, reference should be had to the schematic view of FIGURE 7 wherein the method apparatus comprises an endless conveyor 30 which travels at a steady speed in a horizontal plane and in continuous elevated oval orbit and which may be driven by any suitable means (not shown) under any suitable speed control equipment (not shown). A succession of material handling and operating stations are spaced along conveyor 30. They may comprise, in the order in which they have effect, a loading station 31 at which the separate bodies 11 are accurately registered on a mandrel; a preheating station or chamber 32 in which the body and mandrel are preheated to the proper temperature to receive the moldable material; an injection or depositing station 33 at which an accurately metered amount of a moldable material, preferably a plastisol such as a polyvinyl chloride, is charged or otherwise deposited while in a fluid, a powder or a plastic condition in the mandrels on the conveyor 30; a curing station 34 in which the moldable material may be converted, cured, or otherwise caused to set and will be permanently bonded to the bodies 11; a cooling station or chamber 35 in which the bonded members 11 and 12 are cooled; and finally an unloading station 36 at which the completed cooled composite articles are unloaded from conveyor 30 while the latter continues its travel in a subsequent identical cycle of operation.

The material injection or deposit operation performed at station 33 may be accomplished by any suitable means (not shown); however, it is important that it be exact and accurate as to quantity and timing. Likewise, the body loading operation at 31, and the curing and cooling operations at 34 and 35 respectively, and the article unloading operation at 36 may be performed by any suitable equipment or means, automatic or otherwise, so long as coordination with the mandrel travel is observed.

The preheating, curing and cooling operations should be sufficient to accomplish the desired results with a moldable material of the type mentioned.

Referring now to FIGURE 8, a pair of upstanding locating posts 40, only one of which is shown, are connected to a conventional chain type conveyor 30 shown schematically in FIGURE 7, and provide a mounting for a mandrel case 42. Each of the mandrel cases 42 is formed of a lightweight material, and is preferably an aluminum casting. Each case 42 has a pair of spaced vertical openings 43, only one of which is shown, which receive the upstanding locating posts 40 to enable each case 42 to be quickly and easily assembled with or disassembled from the conveyor 30.

Each mandrel case 42 has a pair of transversely spaced vertical openings 44, and each of said openings 44 has a diameter of sufficient size to receive with a freely sliding clearance a mating downwardly projecting cylindrical portion 45 of an individual mandrel 46, so that such mandrels 46 can be quickly assembled with or disassembled from the mandrel cases.

For lightness in weight, each mandrel 36 is a die casting of aluminum. Preferably, the body 46a of each mandrel is provided at the upper end of the downwardly projecting cylindrical portion 45, with a laterally extending horizontal flange 47, which rests on the upper surface of the case 42. As shown, the axial length of the cylindrical portion 45 is slightly greater than the thickness of a case 42 so that the lower projecting end portion 45a of the portion 45 may be engaged by a tool (not shown) when it is desired to eject upwardly the portion 45 from an opening 44.

The body 46a of each mandrel is provided above the horizontal flange 47 with an upwardly opening concavity 49 surrounding and concentric with an inwardly tapered, upstading centrally located integral projection or pilot pin 50, the lower periphery of which is engageable with the preformed bore 13 of the washer body 11. The inwardly tapered sides of pilot 50 provide a dual function with one function being to provide a small diameter top portion onto which a washer body 11 may be quickly placed after which the progressively increasing diameter of pilot 50 will accurately locate or pilot the body 11. The second function is to provide a progressive clearance with opening 13 of body 11 into which a moldable material may flow in plastic state, which will become more evident in the subsequent description, and to provide a form surface for the moldable material.

In use, the conveyor 30 is first equipped with a complete set of mandrel cases 42 and each case 42 is equipped with its complement of two mandrels 46. Then the conveyor 30 is actuated to transport the mandrels 46 into the loading station 31 where a washer body 11 is inserted over a pilot 50. If desired, as previously explained, the body 11 may be provided with an adhering coating 26 (as shown in FIGURE 9) before the body 11 is inserted over pilot 50. The lower end of opening 13 engages the lowermost periphery of pilot 50 to accurately locate washer body 11 thereabout and a wedge shaped clearance is formed between the sides of pilot 50 and opening 13 of body 11. The conveyor now carries mandrels 46 with assembled washers thereon into preheat station or chamber 32 where the mandrels and washers are preheated to the proper temperature to receive a charge of moldable material. Then the mandrels and washers pass to the mold filling station 33 where suitable means (not shown) deposits, by injection or otherwise, into each of the upwardly opening annular wedge clearances between pilot 50 and opening 13 and on a predetermined area of concave surface 14 an exactly metered amount of moldable material 52 to form the ring 12 as shown in FIGURE 3. A sufficient quantity of moldable material 52 is deposited so that an extension 19 is axially higher than the outer periphery of washer body 11. Then the mandrels 46 pass through curing station or chamber 34 where the moldable material 52 is cured, and set in permanently bonded relation with the washer body 11 with which it is engaged. Said mandrels 46 then pass through a cooling station or chamber 35 and arrive finally at unloading station 36 where the completed composite articles are removed from the mandrels 46. The conveyor 30 is constantly in motion while the mandrels 46 pass from the first to the last station as described. The completed composite articles may be stripped from pilots 50 of the mandrels 46 by exerting a force against the exposed lower ends 14a of the washer bodies 11.

Thus, from the foregoing, it will be apparent that the ring openings are placed in exact concentricity with the preformed opening 13 and that a symmetrical inwardly tapered surface is provided the annulus or ring 12 for engaging the sides of a bolt shank.

The composite articles are produced in complete uniformity and of high quality and at a rapid rate of production. The moldable material 52 will usually be in a fluid or plasticized condition. However, it is contemplated that other materials, in powdered and solid condition suspectible of an exact deposition, may be employed. Any suitable thermoplastic material may be used. However, the nature of the material will of course also determine the necessity and character of the preheating and curing treatment to which it is subjected.

The drawings and the foregoing specification constitute a description of the improved method for manufacturing composite articles in such full, clear, concise and exact terms as to enable any person skilled in the art to practice the invention, the scope of which is indicated by the appended claims.

What I claim as my invention is:

1. The method of making a composite article comprising an annular body having a preformed cylindrical opening therethrough and a resilient ring bonded permanently to said body and lining the cylindrical body opening having a tapered opening in registration with said cylindrical body opening; comprising the steps of providing a mandrel having an upwardly facing support surface and a generally cone-shaped pilot projection surrounded by and extending upwardly from said support surface and at its junction with said support surface having a diameter equal to that of the cylindrical opening through said body, sleeving said body over the pilot projection in contact with said support surface, centering said body by contact of its cylindrical opening with the pilot projection on a circle at the junction of said pilot projection with the support surface and at the same time providing an upwardly flaring V-shaped annular die cavity between said pilot projection and the cylindrical opening through said body, depositing in said annular die cavity a metered charge of a moldable plastic material to form at the same time a tapered opening through the plastic material in registration with the cylindrical opening, curing the moldable plastic material and bonding the same permanently to the body to form a resilient ring lining the cylindrical body opening having a tapered opening in registration with the cylindrical body opening.

2. The method defined in claim 1 wherein the moldable plastic material is deposited in the die cavity by gravity flow.

3. The method of making a composite article comprising an annular body having a preformed cylindrical opening therethrough and a dished upper surface surrounding said opening and also comprising a resilient ring bonded permanently to said body and lining the cylindrical body opening having a tapered opening in registration with said cylindrical body opening; comprising the steps of providing a mandrel having an upwardly facing support surface and a generally cone-shaped pilot projection surrounded by and extending upwardly from said support surface and at its junction with said support surface having a diameter equal to that of the cylindrical opening through said body, sleeving said body over the pilot projection in contact with said support surface and with its dished surface facing upwardly, centering said body by contact of its cylindrical opening with the pilot projection on a circle at the junction of said pilot projection with the support surface and at the same time providing an upwardly flaring V-shaped annular die cavity between said pilot projection and the cylindrical opening through said body, depositing in said annular die cavity a metered charge of a moldable plastic material to form at the same time a tapered opening through the plastic material in registration with the cylindrical opening and overfilling the die cavity to cover at least the radially inner portion of the dished upper surface of the body with a layer of the moldable plastic material constituting an extension of the plastic material within the die cavity, curing the moldable plastic material and bonding the same permanently to the body to form a resilient ring lining the cylindrical body opening having a tapered opening in registration with the cylindrical body opening.

4. The method of making a composite article comprising an annular body having a preformed cylindrical opening therethrough and having upper and lower surfaces of inverted frusto-conical shape surrounding the opening and also comprising a resilient ring bonded permanently to said body and lining the cylindrical body opening having a tapered opening in registration with said cylindrical body opening; comprising the steps of providing a mandrel having an upwardly facing support surface formed with the same taper as the lower surface of said body and having a generally cone-shaped pilot projection surrounded by and extending upwardly from said support surface and at its junction with said support surface having a diameter equal to that of the cylindrical body opening, sleeving said body over the pilot projection in surface-to-surface contact of its lower surface with the support surface of said mandrel, centering said body by contact of its cylindrical opening with the pilot projection on a circle at the junction of said pilot projection with the support surface and at the same time providing an upwardly flaring V-shaped annular die cavity between said pilot projection and the cylindrical body opening, depositing by gravity flow in said annular die cavity a metered charge of a moldable plastic material to form at the same time a tapered opening through the plastic material in registration with the cylindrical opening and overfilling the die cavity to form a layer of the moldable plastic material upon at least the radially inner portion of the dished upper surface of the body as an extension of the moldable plastic material in the die cavity, curing the moldable plastic material and bonding the same permanently to the body to form a resilient ring lining the cylindrical body opening having a tapered opening in registration with the cylindrical body opening.

5. The method defined in claim 4 including the further step of shaping the moldable plastic material to extend up along the pilot projection to a point above the plane containing the radially outer margin of the body.

References Cited in the file of this patent

UNITED STATES PATENTS

| | | |
|---|---|---|
| 300,934 | Abbott | June 24, 1884 |
| 1,518,521 | Kraft | Dec. 9, 1924 |
| 2,393,984 | Gookin | Feb. 5, 1946 |
| 2,644,199 | Miller | July 7, 1953 |
| 2,732,613 | Renholts | Jan. 31, 1956 |
| 2,761,349 | Heller | Sept. 4, 1956 |

FOREIGN PATENTS

| | | |
|---|---|---|
| 698,488 | Great Britain | Oct. 14, 1953 |